(12) United States Patent
Huang et al.

(10) Patent No.: US 11,542,029 B2
(45) Date of Patent: Jan. 3, 2023

(54) METHODS OF FORMING A DUAL-STRUCTURED AIRCRAFT ENGINE STARTER/GENERATOR APPARATUSES

(71) Applicant: GENERAL ELECTRIC COMPANY, Schenectady, NY (US)

(72) Inventors: Hao Huang, Dayton, OH (US); Xiaochuan Jia, Dayton, OH (US); Jan Zywot, Dayton, OH (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 17/007,717

(22) Filed: Aug. 31, 2020

(65) Prior Publication Data

US 2022/0063829 A1    Mar. 3, 2022

(51) Int. Cl.
*B64D 33/08* (2006.01)
*B33Y 80/00* (2015.01)
*H02K 9/00* (2006.01)

(52) U.S. Cl.
CPC .............. *B64D 33/08* (2013.01); *B33Y 80/00* (2014.12); *H02K 9/00* (2013.01)

(58) Field of Classification Search
CPC ........... B64D 33/08; B33Y 80/00; H02K 9/00

USPC ....................................................... 123/41.56
See application file for complete search history.

(56) References Cited

U.S. PATENT DOCUMENTS

| | | | |
|---|---|---|---|
| 7,687,928 B2 * | 3/2010 | Taneja | H02K 9/02 |
| | | | 290/31 |
| 8,450,888 B2 | 5/2013 | Shafer et al. | |
| 10,161,457 B2 | 12/2018 | Gluck | |
| 2018/0205284 A1 | 7/2018 | Huang et al. | |
| 2018/0205285 A1 | 7/2018 | Huang et al. | |
| 2018/0278125 A1 | 9/2018 | Huang et al. | |
| 2018/0297119 A1 | 10/2018 | Clarke | |
| 2018/0320547 A1 | 11/2018 | Bentley et al. | |
| 2018/0363468 A1 * | 12/2018 | Beyer | F01D 5/187 |
| 2020/0177054 A1 * | 6/2020 | Van Seventer | H02K 15/14 |
| 2021/0211012 A1 * | 7/2021 | Yang | H02K 9/00 |
| 2021/0296966 A1 * | 9/2021 | Yagyu | H02K 5/203 |
| 2021/0381084 A1 * | 12/2021 | Ota | B33Y 80/00 |

* cited by examiner

Primary Examiner — Yi-Kai Wang
(74) Attorney, Agent, or Firm — Dinsmore & Shohl LLP

(57) ABSTRACT

A method for manufacturing a dual-structured aircraft engine starting and generating apparatus is provided. The method includes printing a housing using a three-dimensional printing process including a main machine portion and an exciter portion for receiving at least part of a generator system. Printing the housing includes printing a cooling jacket portion comprising one or more cooling passages that is a monolithic part of a sidewall of the housing.

20 Claims, 8 Drawing Sheets

METHODS OF FORMING A DUAL-STRUCTURED AIRCRAFT ENGINE STARTER/GENERATOR APPARATUSES

BACKGROUND

Field

The present specification generally relates to starter/generator apparatuses and, more specifically, to starter/generator apparatuses and methods of forming starter/generator starter/generator apparatuses using three-dimensional printing.

Technical Background

Some current aircraft engines include a starter/generator apparatus that functions as a motor for starting the aircraft engines and as a generator to provide electrical energy to power systems on the aircraft after starting the aircraft engines. In this regard, the starter/generator apparatus has a start mode that converts electrical energy into mechanical energy and a generate mode that converts mechanical energy into electrical energy.

Conventional methods of forming a starter/generator apparatus can include any number of manufacturing processes, such as machining, casting, stamping, stacking, etc. For example, stamped oxidized laminations may be stacked to form a core, and coils may be formed from insulated wire. A housing may be used to house the various separately formed components. These methods may form reliable electrical machines; however, there may be a number of separately formed components that are assembled together, which can increase weight and cost. Accordingly, there is a need for methods for forming a starter/generator apparatus using three-dimensional printing to integrate various components into a single component.

SUMMARY

In one embodiment, a method for manufacturing a dual-structured aircraft engine starting and generating apparatus is provided. The method includes printing a housing using a three-dimensional printing process including a main machine portion and an exciter portion for receiving at least part of a generator system. Printing the housing includes printing a cooling jacket portion comprising one or more cooling passages that is a monolithic part of a sidewall of the housing.

In another embodiment, an aircraft engine starting and generating apparatus includes a three dimensionally printed housing and a generator system. The generator system includes a main stator located in the housing, a main rotor located in a cavity of the main stator, an exciter stator located in the housing, and an exciter rotor located in a cavity of the exciter stator. The housing includes a cooling jacket portion comprising one or more cooling passages that is a monolithic part of a sidewall of the housing.

Additional features and advantages of the starter/generator apparatuses described herein, and the methods of forming the same, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
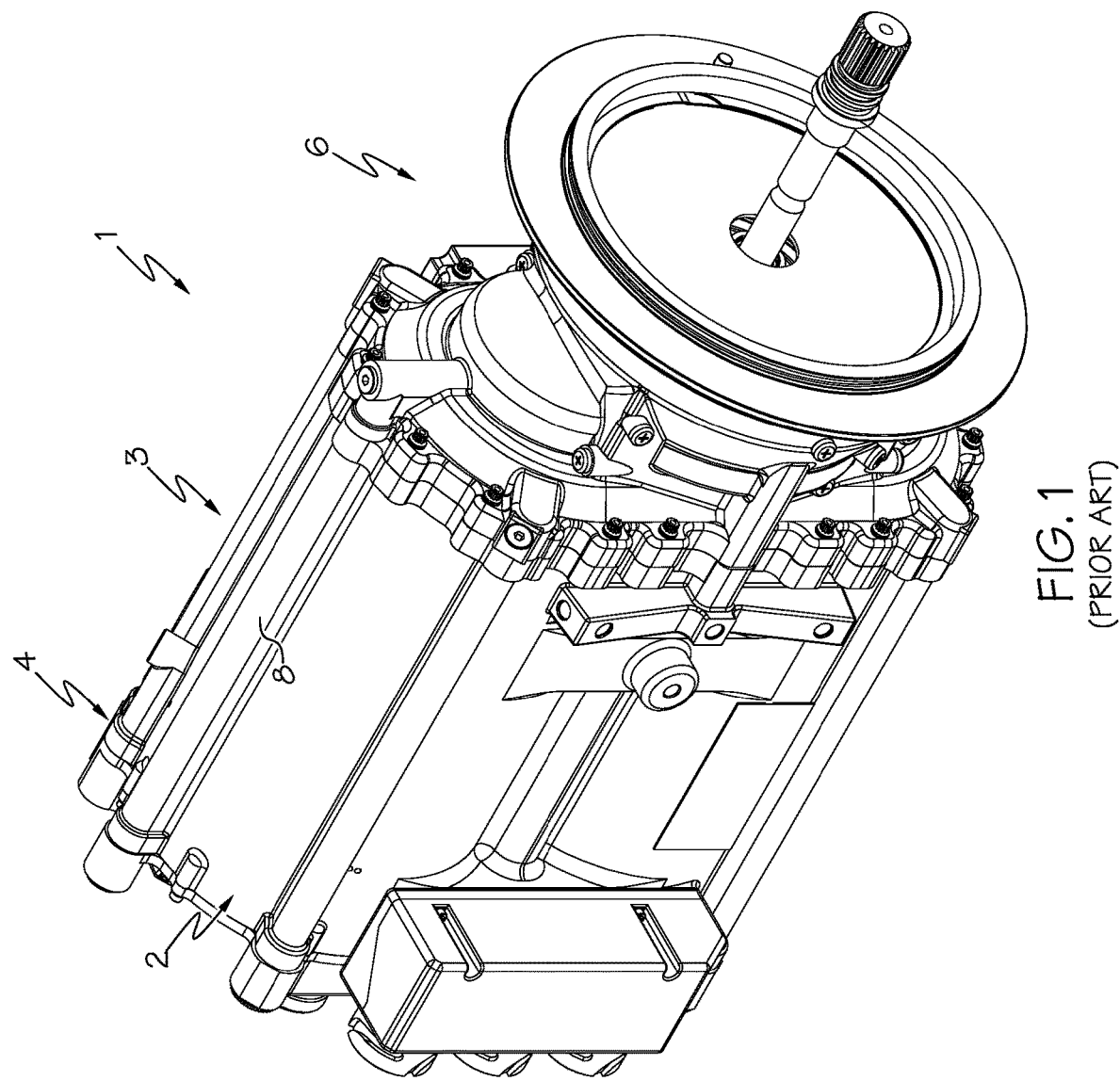
FIG. 1 is a perspective view of a known aircraft engine starting and generating apparatus.

One embodiment of a dual-structured aircraft engine starting and generating apparatus includes a first generator assembly that includes a first exciter and a first main machine. The starting and generating apparatus includes a second generator assembly that includes a second exciter and a second main machine. The first and second main machines may include a main rotor and a main stator that may be formed, at least in part, by a three-dimensional (3D) printing process. Likewise, the first and second exciters may include an exciter rotor and an exciter stator that may be formed, at least in part, by a 3D printing process.

The first generator assembly and the second generator assembly may be located in a housing that houses their respective first exciter, first main machine and second exciter and second main machine. The housing may also be formed, at least in part, by a 3D printing process. A cooling jacket of the housing may be formed integrally as a monolithic part of a sidewall of the housing. End walls of the housing may also be 3D printed as an integral, monolithic part of the housing.

The three-dimensional printing of the first generator assembly and the second generator assembly can also provide an ability to integrate other components that would otherwise be formed separately and connected together, which can reduce weight and complexity of assembly. As one example, front bearing assemblies of the first generator assembly and the second generator assembly, as shown and described in U.S. Pat. No. 7,687,928, filed May 3, 2007, the details of which are hereby incorporated by reference, may be eliminated. As another example, coolant oil tubes may be integrated into the first and second generator assemblies. As another example, a rotor shaft and rotor core of the first and second main machines may be formed as a single, monolithic part. A suitable material for forming the various components may be cobalt iron or silicon iron, as examples.

The term "additive manufacturing" and the like refer generally to manufacturing processes where successive layers of material is provided, one on the other, to build up a three-dimensional component layer-by-layer. The layers generally fuse together to form a monolithic component. Examples of additive manufacturing techniques include Fused Deposition Modeling (FDM), Selective Laser Sintering (SLS), 3D printing such as by inkjets and laserjets, Sterolithography (SLA), Direct Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM, Direct Metal Laser Melting (DMLM), etc. The additive manufacturing processes may allow use of multiple different materials to build a single component.

As used herein, the term "three-dimensional structures" and the like refer generally to intended or actually fabricated three-dimensional configurations (e.g., of structural material or materials) that are intended to be used for a particular purpose. Such structures may be, for example, designed with the aid of a computer aided design (CAD) program.

As used herein, the term "two-dimensional structures" and the like refer generally to layers of the three-dimensional structure that when built, one over the other, form the three-dimensional structures. While referred to as "two-dimensional structures," it should be understood that each layer includes an accompanying thickness in a third dimension, albeit the structures have a relatively planar configuration compared to a fused stack of the two-dimensional structures that form the three-dimensional structures.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring to FIG. 1, a known dual-structured aircraft engine starting and generating apparatus 1 is illustrated. As can be seen, the starting and generating apparatus 1 includes a housing 2 that houses two generator systems includes a main machine section 3, an exciter section 4 and a PMG section 6. The starting and generating apparatus 1 also includes a number of oil tubes 8 that are attached to the housing 2. The housing 2 is large enough to house both of the generator systems. As may be appreciated, the starting and generating apparatus 1 is relatively bulky and heavy. It would be beneficial to reduce a size of the starting and generating apparatus 1 and to integrate components together.

Figure 2:
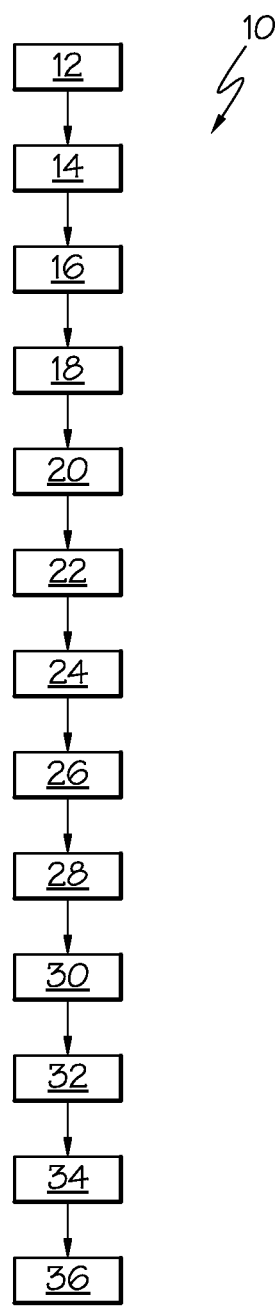
FIG. 2 illustrates a method of forming a dual-structured aircraft engine starting and generating apparatus, according to one or more embodiments shown and described herein.

Referring to FIG. 2, an embodiment of a method 10 of forming a dual-structured aircraft engine starting and generating apparatus is illustrated. The method 10 includes printing a first main rotor at step 12. At step 14, a second main rotor may be printed. In some embodiments, the main rotors may be printed with both a rotor core and rotor shaft being a single, monolithic component. In other embodiments, the rotor core and rotor shaft or at least parts thereof may be printed separately and then connected together. At step 16, a first main stator may be printed and, at step 18, a second main stator may be printed. In some embodiments, the first and second main stators may be printed as part of a housing. In other embodiments, the first and second main stators may be printed separately from the housing and then connected thereto. At step 20, a first exciter rotor may be printed. At step 22, a second exciter rotor may be printed. In some embodiments, the exciter rotors may be printed with both a rotor core and a rotor shaft being a single, monolithic component. At step 24, a first exciter stator may be printed and at step 26 a second main stator may be printed. In some embodiments, the first and second exciter stators may be printed as part of a housing. In other embodiments, the first and second main stators may be printed separately from the housing.

Figure 7:
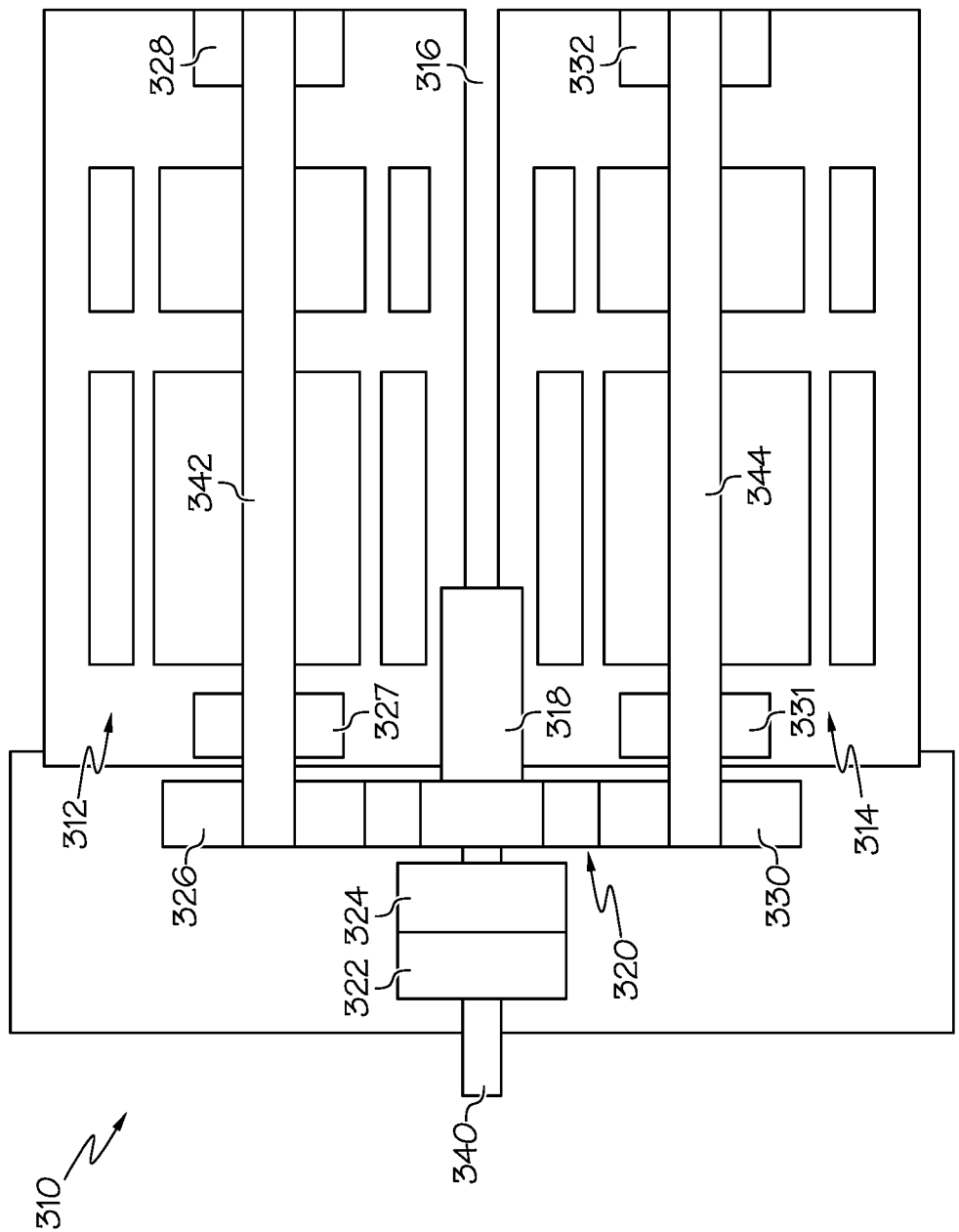
FIG. 7 illustrates another embodiment of an aircraft engine starting and generating apparatus, according to one or more embodiments shown and described herein.

A first generator housing for a first generator assembly can be printed at step 28. A second generator housing for a second generator assembly can be printed at step 30. As will be discussed below, the generator housings can each be printed with a liquid cooling jacket and/or air cooling fins such that the liquid cooling jacket and/or air cooling fins are an integral, monolithic part of the housings. At step 32, a permanent magnet generator (PMG) rotor may be printed and, at step 34, a PMG stator may be printed. At step 36, a gear housing may be printed that can hold the PMG rotor and stator. In some embodiments, the PMG stator may be printed as part of the gear housing. In other embodiments, such as shown by FIG. 7, the PMG may be located at least partially outside the gear housing.

Figure 3:
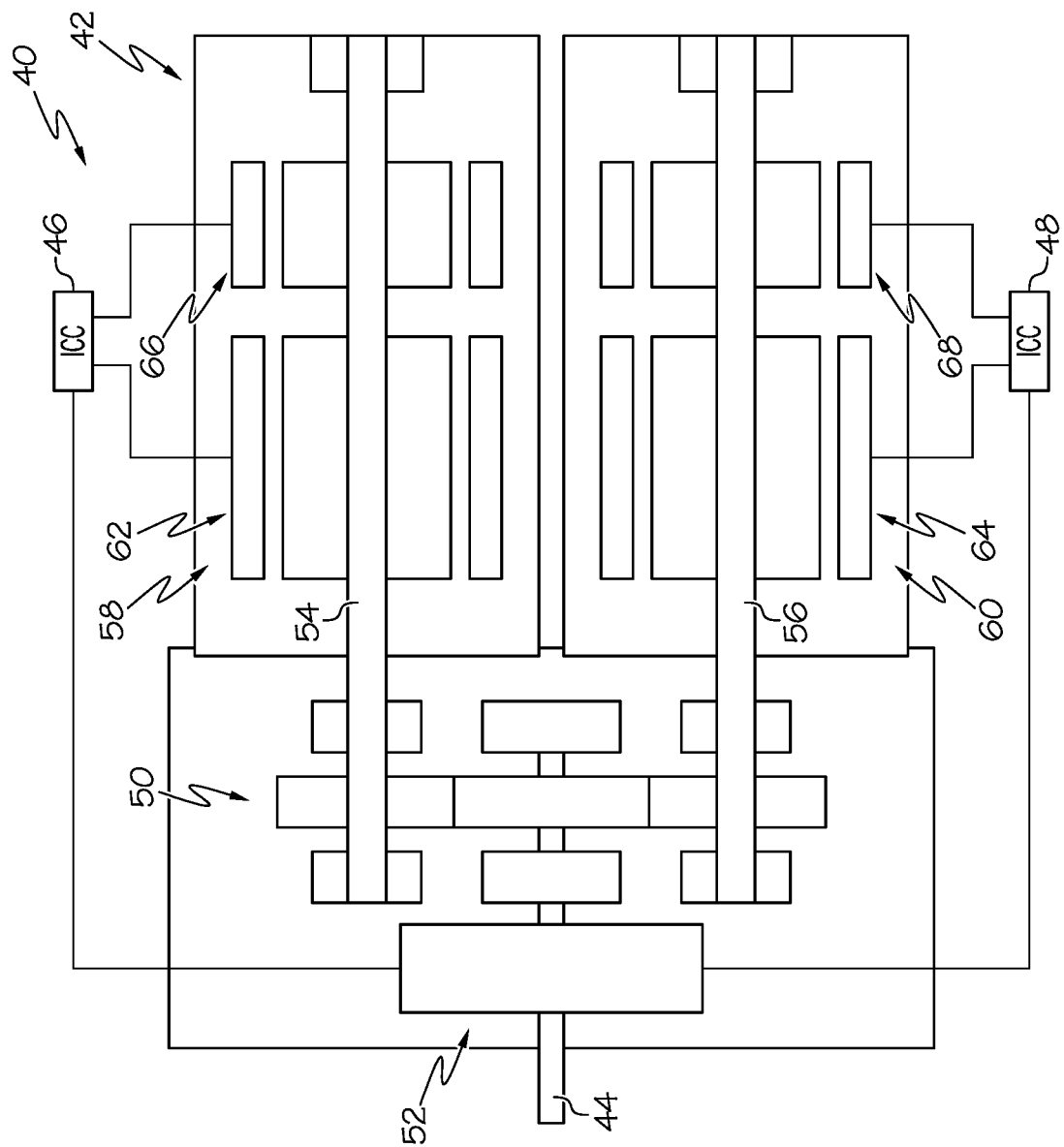
FIG. 3 is a diagrammatic section view of an aircraft engine starting and generating apparatus, according to one or more embodiments shown and described herein.

Referring to FIG. 3, a diagrammatic illustration of an assembled dual-structured engine starting and generating system 40 is illustrated. The engine starting and generating system 40 includes an engine starting and generating apparatus 42, a stub shaft 44 and a pair of inverter converter controllers (ICC) 46 and 48 connected to the engine starting and generating apparatus 42. The engine starting and generating apparatus 42 may be mounted on an engine gearbox, such as using a quick attach detach (QAD) band clamp and coupled to the engine gearbox via the stub shaft 44. In some embodiments, the engine starting and generating apparatus 42 may be oil-cooled and lubricated. The engine starting and generating apparatus 42 includes a speed increaser gear train 50 and a permanent magnet generator (PMG) 52 at an input stage. The speed increaser gear train 50 may include parallel shaft outputs 54 and 56, which couple two synchronous wound machines, referred to as generator systems 58 and 60. The generator systems 58 and 60 each include a main synchronous-wound machine 62 and 64 and exciter 66 and 68.

Each ICC 46 and 48 may be a line replaceable unit (LRU) that is a fuel-cooled, solid-state assembly. The ICCs 46 and 48 may be identical and connected to each of the two generator systems 58 and 60 inside the engine starting and generating apparatus 42 by various power and control cables. The two ICCs 46 and 48 are connected to an internal aircraft power source.

Figure 4:
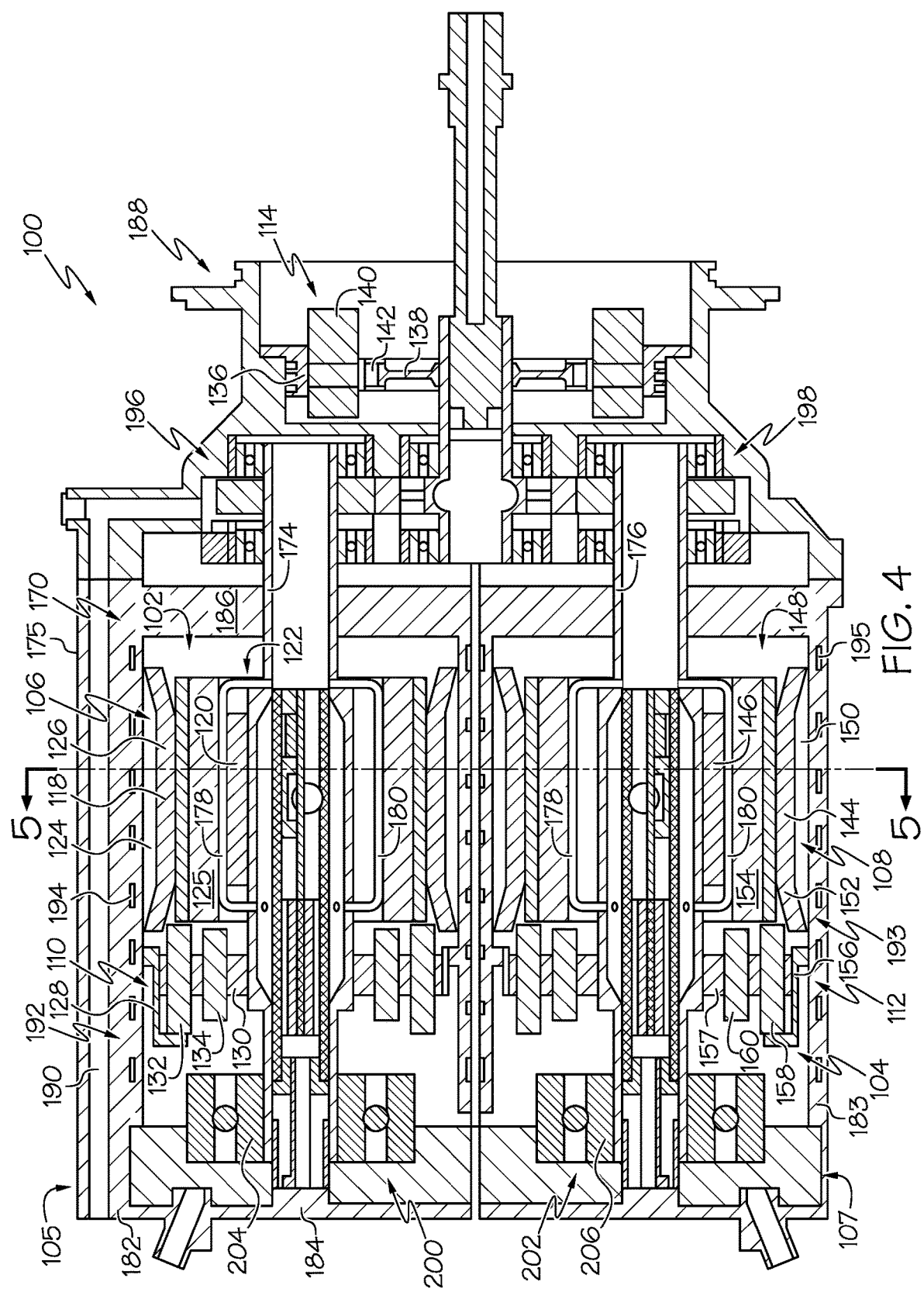
FIG. 4 is a diagrammatic section view of an aircraft engine starting and generating apparatus, according to one or more embodiments shown and described herein.

Referring to FIG. 4, an assembled dual-structured aircraft engine starting and generating apparatus 100 can be formed by the method described above and that includes a first generator system 102 and a second generator system 104. The first generator system 102 and the second generator system 104 are each a combination of three electric machines that include a main machine 106, 108, an exciter 110, 112 and a permanent magnet generator (PMG) 114. The first main machine 106 includes a first main stator 118 and a first main rotor 120 located within a cavity 122 of the first main stator 118. The first main stator 118 includes a first stator core 124 and a plurality of windings 126 that are wound about pole bodies forming stator poles. The first main rotor 120 also includes a plurality of windings 125 that are wound about pole bodies forming rotor poles. Likewise, the first exciter 110 includes a first exciter stator 128 and a first exciter rotor 130. The first exciter stator 128 may include a plurality of windings 132 that are wound about pole bodies forming stator poles. The first exciter rotor 130 may also include a plurality of windings 134 that are wound about pole bodies forming rotor poles. The PMG 114 also includes a PMG stator 136 and a PMG rotor 138. The PMG stator 136 may include a plurality of windings 140 that are wound about pole bodies forming stator poles. The PMG rotor 138 may include rotor poles that are formed by permanent magnets 142.

The second main machine 108 includes a second main stator 144 and a second main rotor 146 located within a cavity 148 of the second main stator 144. The second main stator 144 includes a second stator core 150 and a plurality of windings 152 that are wound about pole bodies forming stator poles. The second main rotor 146 also includes a plurality of windings 154 that are wound about pole bodies forming rotor poles. The second exciter 112 includes a second exciter stator 156 and a second exciter rotor 157. The second exciter stator 156 may include a plurality of windings 158 that are wound about pole bodies forming stator poles. The second exciter rotor 157 may also include a plurality of windings 160 that are wound about pole bodies forming rotor poles.

The plurality of rotor poles of the first and second main machines 106, 108, the first and second exciters 110, 112, and the PMG 114 can generate a plurality of magnetic fields relative to the stator poles such that the apparatus 100 can operate through interaction of magnetic fields and current-carrying conductors to generate force or electric power. The first and second exciters 110, 112 can provide direct current to the first and second main machines 106, 108, and the first and second main machines 106, 108 and PMG 114 can provide AC electrical power when the PMG rotor 138 rotates.

The apparatus 100 can be oil cooled and thus can include a cooling system 170. The cooling oil can be used to dissipate heat generated by the electrical and mechanical functions of the apparatus 100. The cooling system 170 can also provide for lubrication of the apparatus 100 using oil. In illustrated aspects, the apparatus 100 can be configured such to operate as dry cavity system. The cooling system 170 can include, for example, a cooling fluid reservoir and various cooling passages. Rotor shafts 174, 176 can provide one or more flow channels or paths coupling the rotor shafts 174, 176 with a plurality of closed flow channels 178, 180. The flow channels 178, 180 can enable the flow of cooling fluid, such as oil, for the main rotors 120, 146. In some embodiments, the cooling system 170 may be configured to operate as a wet cavity system or as a combination of a wet and dry cavity system.

Figure 5A:
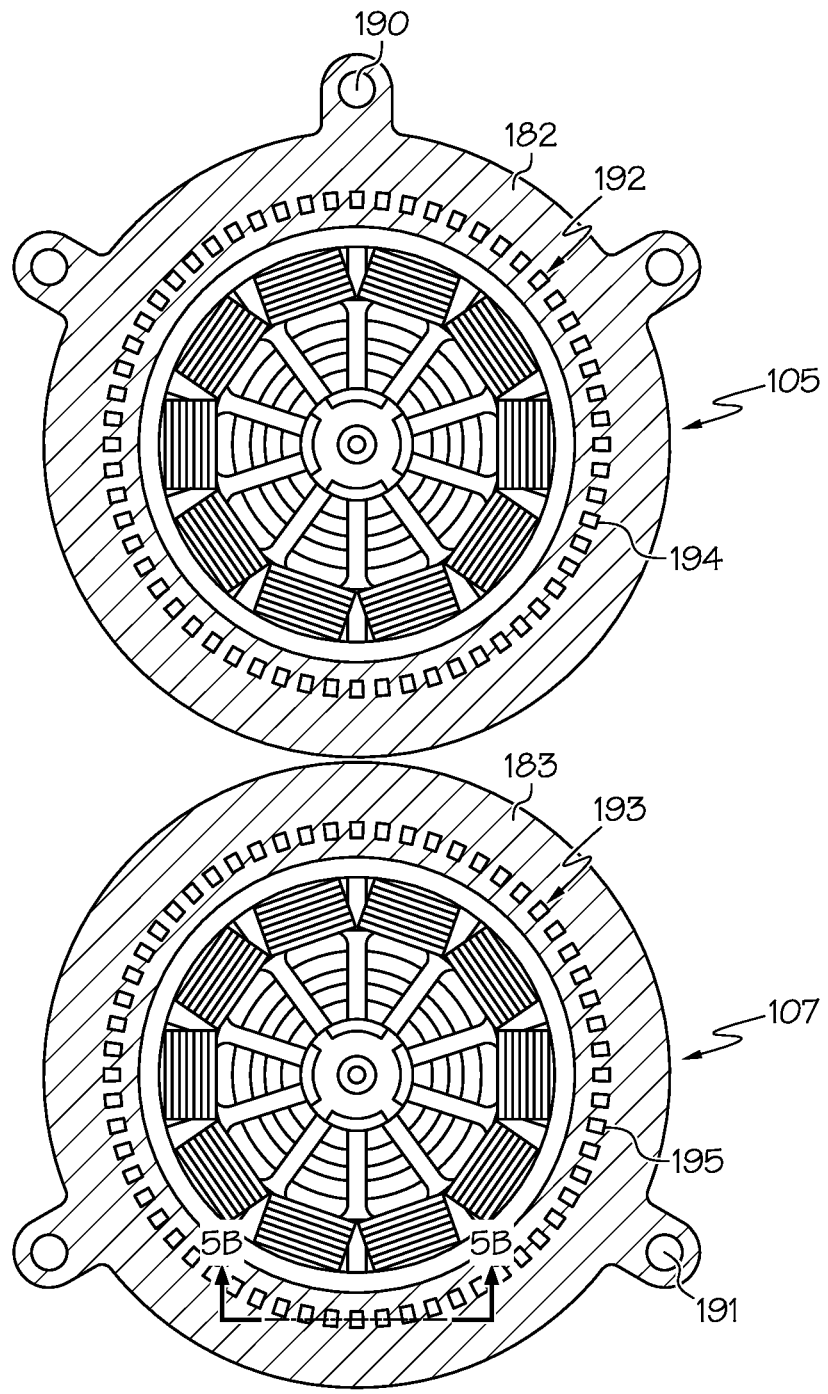
FIG. 5A is a section view of the aircraft engine starting and generating apparatus along line 5-5 of FIG. 4.

Referring also to FIG. 5A, the housings 105, 107 are 3D printed and each is formed as a single, monolithic structure. The housing 105 includes a sidewall 182, a rear wall 184 and a front wall 186 that connects to a gear housing 188. The sidewall 182 may include one or more cooling passages 190 that are formed integrally with the sidewall 182 during the 3D printing process. The cooling passage 190 can be used to deliver cooling and lubricating oil directly to bearing assemblies 196 and 198 in gear housing 188. The sidewall 182 may also include a cooling jacket portion 192 that is also formed as part of the housing 105. The cooling jacket portion 192 includes a cooling passage 194 through which cooling oil can travel in order to remove heat from the housing 105. The cooling passage 190 is wider than the cooling passages 194 forming part of the cooling jacket portion 192. Forming the housing 105 as a single, monolithic piece and integrating the cooling passages 190 and 194 can reduce the overall weight of the engine starting and generating apparatus 100 by reducing the number of individual components and amount of material.

Like the housing 105, the housing 107 includes a sidewall 183, a rear wall 185 and a front wall 187 that connects to a gear housing 188. The sidewall 183 may include one or more cooling passages 191 that are formed integrally with the sidewall 183 during the 3D printing process. The cooling passage 191 can be used to deliver cooling and lubricating oil directly to bearing assemblies 196 and 198 in gear housing 188. The sidewall 183 may also include a cooling jacket portion 193 that is also formed as part of the housing 107. The cooling jacket portion 193 includes a cooling passage 195 through which cooling oil can travel in order to remove heat from the housing 107. The cooling passage 191 is wider than the cooling passages 195 forming part of the cooling jacket portion 193. Forming the housing 107 as a single, monolithic piece and integrating the cooling passages 191 and 195 can reduce the overall weight of the engine starting and generating apparatus 100 by reducing the number of individual components and amount of material. In some embodiments, the gear housing 188 may also be 3D printed as a single, monolithic piece of material, which can further reduce weight. In some embodiments, the gear housing 188 may also be 3D printed as a single, monolithic piece of material, which can further reduce weight.

Figure 5B:
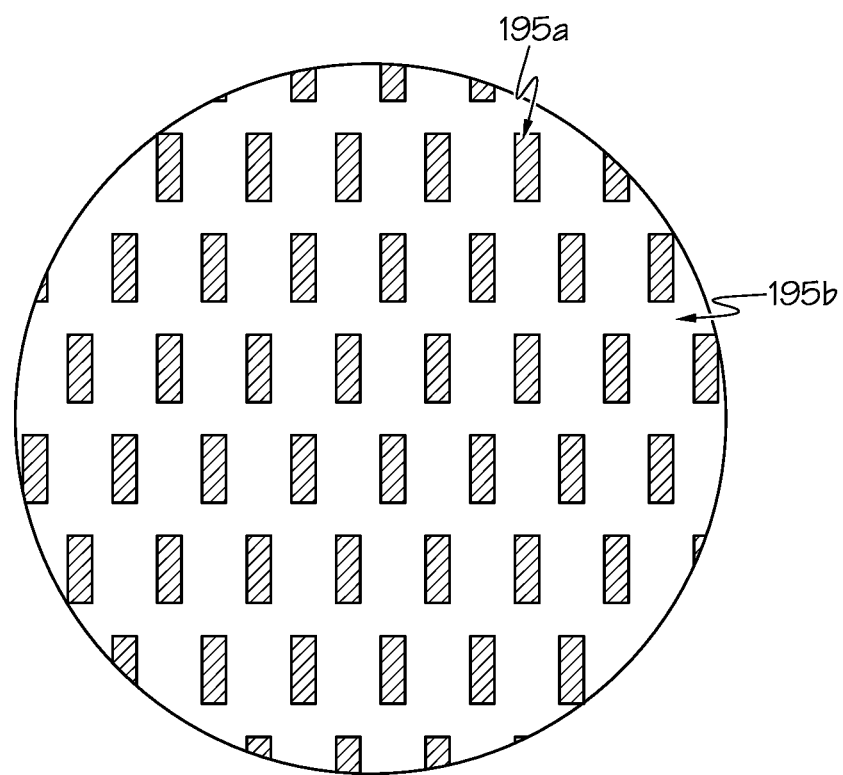
FIG. 5B is a diagrammatic illustration of cooling passages for a cooling jacket of a housing for the aircraft engine starting and generating apparatus along line 5B-5B of FIG. 5A, according to one or more embodiments shown and described herein.

Referring to FIG. 5B, the cooling passages 195 may be a network of passages that extend both circumferentially and axially. In the illustrated example, the axial cooling passages 195a and the circumferential cooling passages 195b intersect, which allows the cooling fluid to flow both circumferentially and axially. Other passage arrangements are possible, such as only axially extending or only circumferentially extending. In some embodiments, the cooling passage may form a spiral that extends both circumferentially and axially. Any suitable shape for the cooling passages may be used.

Figure 6:
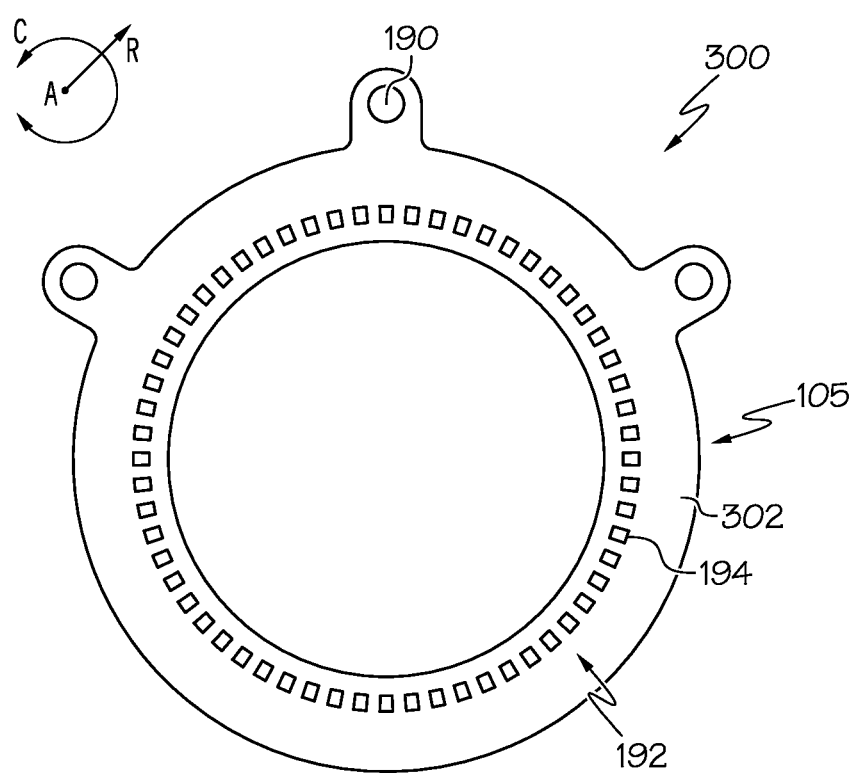
FIG. 6 is a diagrammatic illustration of a layer of the housing of the aircraft engine starting and generating apparatus, according to one or more embodiments shown and described herein.

FIG. 6 depicts diagrammatically an example layer 300 of the housing 105 that is 3D printed. The layer 300 defines an axial direction A, a radial direction R and a circumferential direction C that extends 360 degrees about the axial direction A. The axial direction A extends into and out of the page. The layer can be printed using any suitable material.

The layer 300 is printed to include a body portion 302 and the oil passages 190. The cooling jacket portion 192 is printed as part of the body portion 302 and includes the flow passages 194 that can extend about an entire periphery of the body portion 302. The flow passages 194 can extend lengthwise in any suitable axial and circumferential direction or both. While the flow passages 194 are illustrated as spaced-apart in the circumferential direction, the flow passages 194 may be interconnected to form a continuous flow passage on the housing 105 is formed of the multiple layers.

Referring again to FIG. 4, the engine starting and generating apparatus 100 may include end bells 200 and 202 that each include bearing assemblies 204 and 206 that rotatably support rotating shafts 174, 176. Typical engine starting and generating apparatuses, such as one described by U.S. Pat. No. 7,687,928 and the one depicted by FIG. 1, include another end bell at a drive end of the engine starting and generating apparatuses. These end bells also include bearing assemblies. However, in the present embodiment, the drive end bearing assemblies are eliminated using the 3D printing process as improved tolerances between the housing 105 and the shafts 174, 176 can be achieved. Eliminating the bearing assemblies can further reduce weight and increase efficiency of the engine starting and generating apparatus 100.

Any of the other components of the starting and generating apparatus 100 may be formed by additive manufacturing. For example, any of the exciter and PMG rotors and stators may be 3D printed.

Printing the housing and other components of the engine starting and generating apparatus can also provide flexibility in the design of the engine starting and generating apparatus. For example, referring to FIG. 7, another engine starting and generating apparatus 310 includes a first generator system 312 and a second generator system 314 similar to those described above. In this embodiment, a space 316 is provided between the first and second generator systems 312 and 314 during the additive manufacturing process that is suitable to receive a PMG 318. The PMG 318 is operatively linked to the first and second generator systems 312 and 314 through gears 320. Bearings 322, 324, 326, 328, 330 and 332 may be provided to support stub shaft 340 and generator shafts 342 and 344.

The above described engine starting and generating apparatuses are built using an additive manufacturing process where the oil passages and cooling jackets are integrated into the housing instead of being formed by separate components and added to the housings. The front bearings may be eliminated due to the precision of the 3D printing processes. By eliminating components and reducing material, weight of the engine starting and generating apparatuses can be reduced and efficiency may be increased. Further, use of additive manufacturing processes can allow for variations in design of the engine starting and generating apparatuses, which can also reduce weight and increase efficiency.

Further aspects of the invention are provided by the subject matter of the following clauses:

Clause 1. A method for manufacturing a dual-structured aircraft engine starting and generating apparatus, the method comprising: printing a housing using a three-dimensional printing process including a main machine portion and an exciter portion for receiving at least part of a generator system; and wherein the step of printing the housing includes printing a cooling jacket portion comprising one or more cooling passages that is a monolithic part of a sidewall of the housing.

Clause 2. The method of any preceding clause, wherein the step of printing the housing comprises printing another cooling passage that is larger in width than the one or more cooling passages that are part of the cooling jacket.

Clause 3, the method of any preceding clause, wherein the step of printing the housing comprises printing multiple cooling passages that are part of the cooling jacket portion.

Clause 4. The method of any preceding clause, wherein the multiple cooling passages include both axially-extending cooling passages and circumferentially-extending cooling passages that intersect the axially-extending cooling passages.

Clause 5. The method of any preceding clause, wherein the housing is a first housing, the method further comprising: printing a second housing using a three-dimensional printing process including a main machine portion and an exciter portion for receiving at least part of another generator system; and wherein the step of printing the second housing includes printing a second cooling jacket portion comprising one or more cooling passages that is a monolithic part of a sidewall of the second housing.

Clause 6. The method of any preceding clause, wherein the step of printing the second housing comprises printing another cooling passage that is larger in width than the one or more cooling passages of the second housing that are part of the cooling jacket of the second housing.

Clause 7. The method of any preceding clause, wherein the step of printing the second housing comprises printing multiple cooling passages that are part of the cooling jacket portion of the second housing.

Clause 8. The method of any preceding clause, wherein the multiple cooling passages of the second housing include both axially-extending cooling passages and circumferentially-extending cooling passages that intersect the axially-extending cooling passages of the second housing.

Clause 9. The method of any preceding clause further comprising: positioning at least part of a first generator system into the first housing; and positioning at least part of a second generator system into the second housing.

Clause 10. The method of any preceding clause further comprising connecting the first housing and the second housing to a gear housing such that both of the first generator system and the second generator system are operably connected to a permanent magnet generator located at least partially outside the gear housing.

Clause 11. The method of any preceding clause, wherein the first generator system is connected to the permanent magnet generator by a first output shaft without use of a drive end bearing connected to the first housing and the second generator system is connected to the permanent magnet generator by a second output shaft without use of a drive end bearing connected to the second housing.

Clause 12. The method of any preceding clause, wherein the step of printing the second housing comprises printing another cooling passage that is larger in width than the one or more cooling passages that are part of the cooling jacket and aligning the another cooling passage with a third cooling passage that extends axially though the gear housing that extends to a bearing assembly in the gear housing.

Clause 13. An aircraft engine starting and generating apparatus comprising: a three dimensionally printed housing; and a generator system comprising: a main stator located in the housing; a main rotor located in a cavity of the main stator; an exciter stator located in the housing; and an exciter rotor located in a cavity of the exciter stator; wherein the housing comprises a cooling jacket portion comprising one or more cooling passages that is a monolithic part of a sidewall of the housing.

Clause 14. The apparatus of any preceding clause, wherein the housing comprises another cooling passage that is larger in width than the one or more cooling passages that are part of the cooling jacket, the another cooling passage being three dimensionally printed with the housing.

Clause 15. The apparatus of any preceding clause, wherein the housing is a first housing, the apparatus further comprising a second housing that is three dimensionally printed, the second housing comprising another cooling jacket portion comprising one or more cooling passages that is a monolithic part of a sidewall of the second housing.

Clause 16. The apparatus of any preceding clause, wherein the generator system is a first generator system, the apparatus further comprising a second generator system comprising: a second main stator located in the second housing; a second main rotor located in a cavity of the main stator; a second exciter stator located in the second housing; and a second exciter rotor located in a cavity of the exciter stator; wherein the first housing and the second housing are connected to a gear housing such that both of the first generator system and the second generator system are operably connected to a permanent magnet generator located inside the gear housing.

Clause 17. The apparatus of any preceding clause, wherein the first generator system is connected to the permanent magnet generator by a first output shaft without use of a drive end bearing mounted to the first housing and the second generator system is connected to the permanent magnet generator by a second output shaft without use of a drive end bearing mounted to the second housing.

Clause 18. The apparatus of any preceding clause, wherein the second housing comprises another cooling passage that is larger in width than the one or more cooling passages that are part of the another cooling jacket of the second housing, the another cooling passage being three dimensionally printed with the second housing.

Clause 19. The apparatus of any preceding clause, wherein the cooling jacket portion comprises multiple cooling passages that are a monolithic part of the sidewall of the housing.

Clause 20. The apparatus of any preceding clause, wherein the multiple cooling passages include both axially-extending cooling passages and circumferentially-extending cooling passages that intersect the axially-extending cooling passages.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for manufacturing a dual-structured aircraft engine starting and generating apparatus, the method comprising:
    using a three-dimensional printing process, printing a housing including a main machine portion and an exciter portion for receiving at least part of a generator system; and
    wherein the step of printing the housing includes printing a cooling jacket portion that is a monolithic part of a sidewall of the housing comprising multiple cooling passages;
    wherein the multiple cooling passages include axially-extending first cooling passages and circumferentially-extending second cooling passages that intersect the axially-extending first cooling passages;
    wherein the circumferentially-extending second cooling passages are continuous around a circumference of the cooling jacket portion such that each circumferentially-extending second cooling passage intersects multiple axially-extending first cooling passages.

2. The method of claim 1, wherein the step of printing the housing comprises printing a third cooling passage that extends axially through the same housing as the first and second cooling passages and is located radially outside the first and second cooling passages.

3. The method of claim 1, wherein the housing is a first housing, the method further comprising:
    printing a second housing using a three-dimensional printing process including a main machine portion and an exciter portion for receiving at least part of another generator system; and
    wherein the step of printing the second housing includes printing a second cooling jacket portion comprising one or more cooling passages that is a monolithic part of a sidewall of the second housing.

4. The method of claim 3, wherein the step of printing the second housing comprises printing another cooling passage that is wider than the one or more cooling passages of the second housing that are part of the cooling jacket of the second housing.

5. The method of claim 3, wherein the step of printing the second housing comprises printing multiple cooling passages that are part of the cooling jacket portion of the second housing.

6. The method of claim 5, wherein the multiple cooling passages of the second housing include both axially-extending cooling passages and circumferentially-extending cooling passages that intersect the axially-extending cooling passages of the second housing.

7. The method of claim 3 further comprising:
    positioning at least part of a first generator system into the first housing; and
    positioning at least part of a second generator system into the second housing.

8. The method of claim 7 further comprising connecting the first housing and the second housing to a gear housing such that both of the first generator system and the second generator system are operably connected to a permanent magnet generator located at least partially outside the gear housing.

9. The method of claim 8, wherein the first generator system is connected to the permanent magnet generator by a first output shaft with use of only a single drive end bearing connected to the first housing and the second generator system is connected to the permanent magnet generator by a second output shaft with use of only a single drive end bearing connected to the second housing.

10. The method of claim 8, wherein the step of printing the second housing comprises printing another cooling passage that is larger than the one or more cooling passages that are part of the cooling jacket and aligning the another cooling passage with a third cooling passage that extends axially though the gear housing that extends to a bearing assembly in the gear housing.

11. An aircraft engine starting and generating apparatus comprising:
a three dimensionally printed housing; and
a generator system comprising:
a main stator located in the housing;
a main rotor located in a cavity of the main stator;
an exciter stator located in the housing; and
an exciter rotor located in a cavity of the exciter stator;
wherein the housing comprises a cooling jacket portion comprising multiple cooling passages that is a monolithic part of a sidewall of the housing;
wherein the multiple cooling passages include axially-extending first cooling passages and circumferentially-extending second cooling passages that intersect the axially-extending first cooling passages;
wherein the circumferentially-extending second cooling passages are continuous around a circumference of the cooling jacket portion such that each circumferentially-extending second cooling passage intersects multiple axially-extending first cooling passages.

12. The apparatus of claim 11, wherein the housing comprises a third cooling passage that extends axially through the same housing as the first and second cooling passages and is located radially outside the first and second cooling passages, the third cooling passage being three dimensionally printed with the housing.

13. The apparatus of claim 12, wherein the housing is a first housing, the apparatus further comprising a second housing that is three dimensionally printed, the second housing comprising another cooling jacket portion comprising one or more cooling passages that is a monolithic part of a sidewall of the second housing.

14. The apparatus of claim 13, wherein the generator system is a first generator system, the apparatus further comprising a second generator system comprising:
a second main stator located in the second housing;
a second main rotor located in a cavity of the main stator;
a second exciter stator located in the second housing; and
a second exciter rotor located in a cavity of the exciter stator;
wherein the first housing and the second housing are connected to a gear housing such that both of the first generator system and the second generator system are operably connected to a permanent magnet generator located inside the gear housing.

15. The apparatus of claim 14, wherein the first generator system is connected to the permanent magnet generator by a first output shaft with use of only a single drive end bearing mounted to the first housing and the second generator system is connected to the permanent magnet generator by a second output shaft with use of only a single drive end bearing mounted to the second housing.

16. The apparatus of claim 14, wherein the second housing comprises another cooling passage that is larger than the one or more cooling passages that are part of the another cooling jacket of the second housing, the another cooling passage being three dimensionally printed with the second housing.

17. The apparatus of claim 11, wherein the axially-extending first cooling passages and circumferentially-extending second cooling passages are rectangular in cross-sectional shape.

18. The apparatus of claim 11, wherein the circumferentially-extending second cooling passages extend circumferentially in a spiral shape.

19. The method of claim 1, wherein the axially-extending first cooling passages and circumferentially-extending second cooling passages are rectangular in cross-sectional shape.

20. The method of claim 1, wherein the circumferentially-extending second cooling passages extend circumferentially in a spiral shape.

* * * * *